(12) United States Patent
Bates et al.

(10) Patent No.: US 7,859,971 B2
(45) Date of Patent: Dec. 28, 2010

(54) DIRECTORY HOLOGRAM FORMING AN ANCHOR LOCATION OF A PATTERN OF STORED HOLOGRAMS

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 11/771,179

(22) Filed: Jun. 29, 2007

(65) Prior Publication Data
US 2009/0003179 A1    Jan. 1, 2009

(51) Int. Cl.
*G11B 7/0065* (2006.01)
(52) U.S. Cl. ...................................... 369/103
(58) Field of Classification Search .................. 369/103
See application file for complete search history.

(56) References Cited

U.S. PATENT DOCUMENTS

| | | | | |
|---|---|---|---|---|
| 3,810,108 | A | 5/1974 | Krewson et al. | 340/172.5 |
| 6,052,799 | A | 4/2000 | Li et al. | 714/13 |
| 6,272,095 | B1 | 8/2001 | Liu et al. | 369/103 |
| 6,285,474 | B1 | 9/2001 | Kawano et al. | 359/29 |
| 6,738,863 | B2 | 5/2004 | Butterworth et al. | 711/114 |
| 6,801,348 | B2* | 10/2004 | Ramapujam et al. | 359/34 |
| 6,995,882 | B2* | 2/2006 | Horimai | 359/2 |
| 7,116,626 | B1 | 10/2006 | Woods et al. | 369/103 |
| 7,492,691 | B2* | 2/2009 | Earhart | 369/103 |
| 2002/0136143 | A1 | 9/2002 | Edwards | 369/103 |
| 2004/0218237 | A1 | 11/2004 | Berstis | 359/3 |
| 2005/0270856 | A1 | 12/2005 | Earhart et al. | 365/189.05 |
| 2006/0114792 | A1* | 6/2006 | Uno et al. | 369/103 |
| 2006/0233088 | A1 | 10/2006 | McNiece | 369/103 |
| 2007/0054195 | A1* | 3/2007 | Usami | 430/2 |

FOREIGN PATENT DOCUMENTS

| | | |
|---|---|---|
| EP | 1507178 | 2/2005 |
| WO | 2004/109364 | 12/2004 |
| WO | 2005/029495 | 3/2005 |
| WO | 2005/103842 | 11/2005 |
| WO | 2006/093254 | 9/2006 |
| WO | 2007/126235 | 11/2007 |

* cited by examiner

*Primary Examiner*—Wayne R Young
*Assistant Examiner*—Aneeta Yodichkas
(74) *Attorney, Agent, or Firm*—John H. Holcombe

(57) ABSTRACT

A method writes at least a group of holograms in a predetermined pattern in the holographic storage medium, and writes a directory hologram which relates to the holograms of the group to form an anchor location of the predetermined pattern. Further, a directory comprising the directory hologram is stored in a memory, and a read operation of at least one hologram of a group is initiated with an access for the directory hologram of the group at the anchor location; reading the accessed hologram, employing a matched filter to cross-correlate the read accessed hologram with an ideal version of the directory hologram derived from the directory stored in the memory; and determining whether the read accessed hologram is the directory hologram of the group.

10 Claims, 12 Drawing Sheets

| Initial State 291 | Destination State 292 | Host Information 293 | Encoded Data 294 |
|---|---|---|---|
| S0 | S0 | 0 | 00 |
| S0 | S1 | 1 | 11 |
| S1 | S2 | 0 | 01 |
| S1 | S3 | 1 | 10 |
| S2 | S4 | 0 | 11 |
| S2 | S5 | 1 | 00 |
| S3 | S6 | 0 | 10 |
| S3 | S7 | 1 | 01 |
| S4 | S0 | 0 | 11 |
| S4 | S1 | 1 | 00 |
| S5 | S2 | 0 | 10 |
| S5 | S3 | 1 | 01 |
| S6 | S4 | 0 | 00 |
| S6 | S5 | 1 | 11 |
| S7 | S6 | 0 | 01 |
| S7 | S7 | 1 | 10 |

*FIG. 15*

DIRECTORY HOLOGRAM FORMING AN ANCHOR LOCATION OF A PATTERN OF STORED HOLOGRAMS

DOCUMENT INCORPORATED BY REFERENCE

Commonly assigned U.S. patent application Ser. No. 11/737,670 is incorporated for its showing of holographic data storage systems and matched filters.

FIELD OF THE INVENTION

This invention relates to holographic data storage, and, more particularly, to the storage of data as holograms at a plurality of locations of a holographic storage medium

BACKGROUND OF THE INVENTION

Holographic storage comprises a high density data storage capability. Typically, data is recorded into a holographic medium be employing a data beam that is two-dimensional in nature and comprises a rectangular image of a large number of bits arranged in a raster pattern. The data beam and a reference beam are separately directed to the holographic medium and intersect and interfere to form an interference wave front that is recorded as a holographic image known as a hologram into the holographic medium. Additional hologram may be recorded along linear tracks and at various depths of the holographic medium to provide a high capacity data storage.

SUMMARY OF THE INVENTION

Methods for storing holograms with respect to at least one holographic storage medium, the holograms at a plurality of locations in the holographic storage medium. In one embodiment, the method involves writing at least a group of the holograms in a predetermined pattern in the holographic storage medium; and writing a directory hologram which relates to the holograms of the group to form an anchor location of the predetermined pattern.

In another embodiment, the method involves writing at least a group of the holograms in a predetermined pattern in the holographic storage medium; writing a directory hologram which relates to the holograms of the group to form an anchor location of the predetermined pattern, wherein a directory comprising the directory hologram is also stored in a memory; initiating access to at least one hologram of a group with an access for the directory hologram, employing a partial matched filter to cross-correlate the read accessed hologram with an ideal version of the directory hologram derived from the directory stored in the memory; and determining whether the read accessed hologram is the directory hologram of the group.

In a further embodiment, the step of writing the directory hologram comprises writing the directory hologram to form the anchor location in the vicinity of a reference line of the holographic storage media.

In another embodiment, the step of reading the accessed hologram comprises illuminating the accessed hologram with an object wave; and providing the ideal version of the directory hologram as the object wave and cross-correlating the resultant wave image employing a partial matched filter matched to the impulse response of a reference for the directory hologram.

In a further embodiment, the step of reading the accessed hologram additionally comprises also illuminating the accessed hologram with a reference wave; and also cross-correlating the resultant wave image employing a partial matched filter matched to the impulse response of an ideal version of the directory hologram.

In another embodiment, the step of reading the accessed hologram comprises illuminating the accessed hologram with a reference wave; and cross-correlating the resultant wave image employing a partial matched filter matched to the impulse response of an ideal version of the directory hologram.

A further embodiment comprises arranging data into at least one RAID configuration comprising a plurality of RAID data segments and to provide metadata of the RAID data segments; and writing the RAID data segments as separate holograms of at least one group, and writing the directory hologram containing the metadata.

An embodiment of a method for accessing holograms with respect to at least one holographic storage medium, the holograms at a plurality of locations in the holographic storage medium; the holograms arranged in at least a group of the holograms in a redetermined pattern in the holographic storage medium with a directory hologram which relates to the holograms of the group, the directory hologram forming an anchor location of the predetermined pattern; and wherein a directory comprising the directory hologram is also stored in a memory; comprises initiating access to at least one hologram of a group with an access for the directory hologram of the group at the anchor location; reading the accessed hologram, employing a partial matched filter to cross-correlation the read accessed hologram with an ideal version of the directory hologram derived from the directory stored in the memory; and determining whether the read accessed hologram is the directory hologram of the group.

In a further embodiment, the step of reading the accessed hologram comprises illuminating the accessed hologram with an object wave; and providing the ideal version of the directory hologram as the object wave and cross-correlating the resultant wave image employing a partial matched filer matched to the impulse response of a reference wave for the directory hologram.

In a still further embodiment, the step of reading the accessed hologram additionally comprises also illuminating the accessed hologram with a reference wave; and also cross-correlating the resultant wave image employing a partial matched filer matched to the impulse response of an ideal version of the directory hologram.

In another embodiment, the step of reading the accessed hologram comprises illuminating the accessed hologram with a reference wave; and cross-correlating the resultant wave image employing a partial matched filer matched to the impulse response of an ideal version of the directory hologram.

For a fuller understanding of the present invention, reference should be made to the following detailed description taken in conjunction with the accompanying drawings.

BRIEF DESCRIPTION OF THE DRAWINGS

FIG. 15 is an encoding-decoding table for the RAID system of FIGS. 10, 11, 13 and 14.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
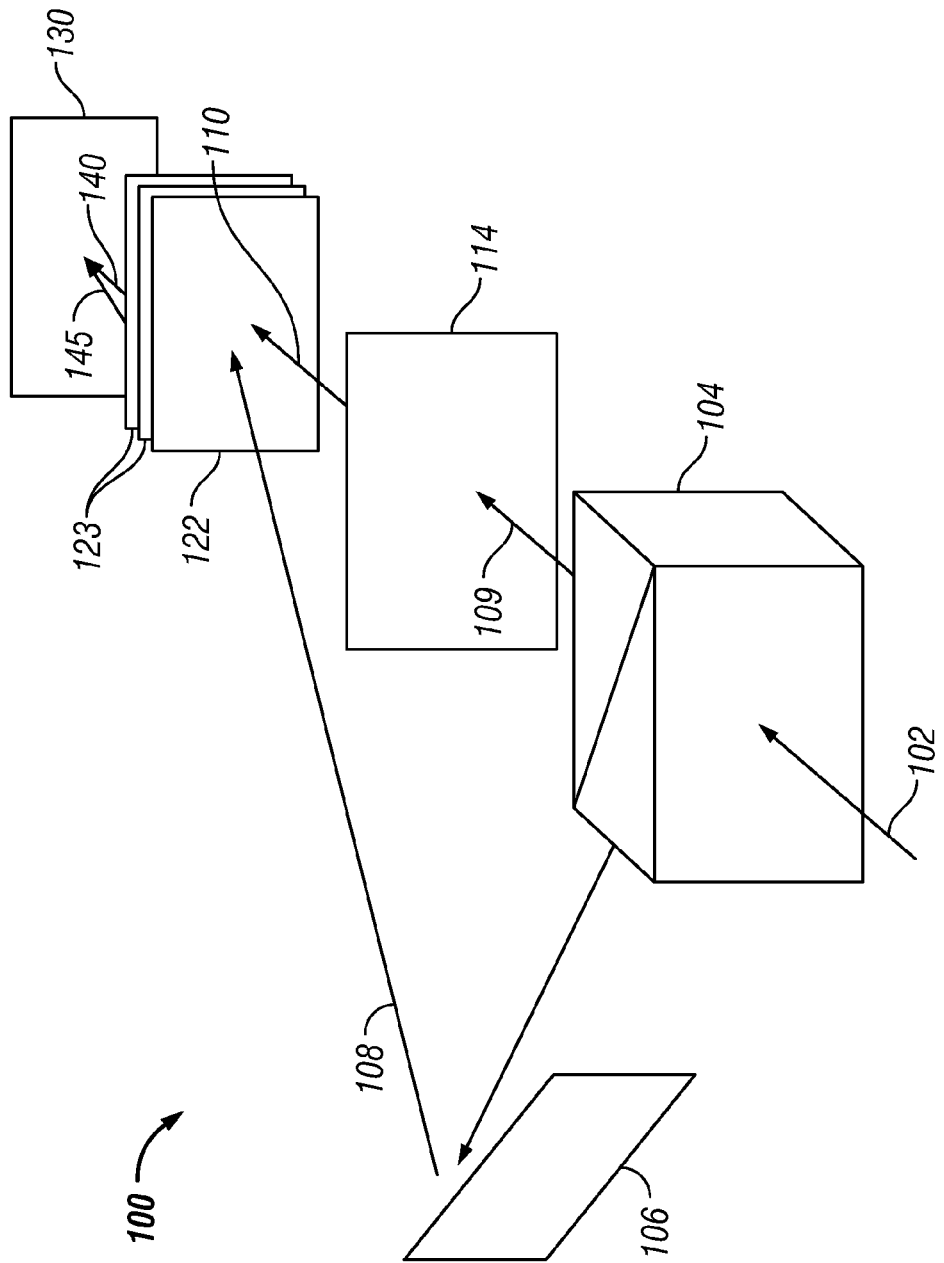
FIG. 1 is a diagrammatic illustration of an embodiment of a holographic storage drive in accordance with the present invention.
Figure 2:
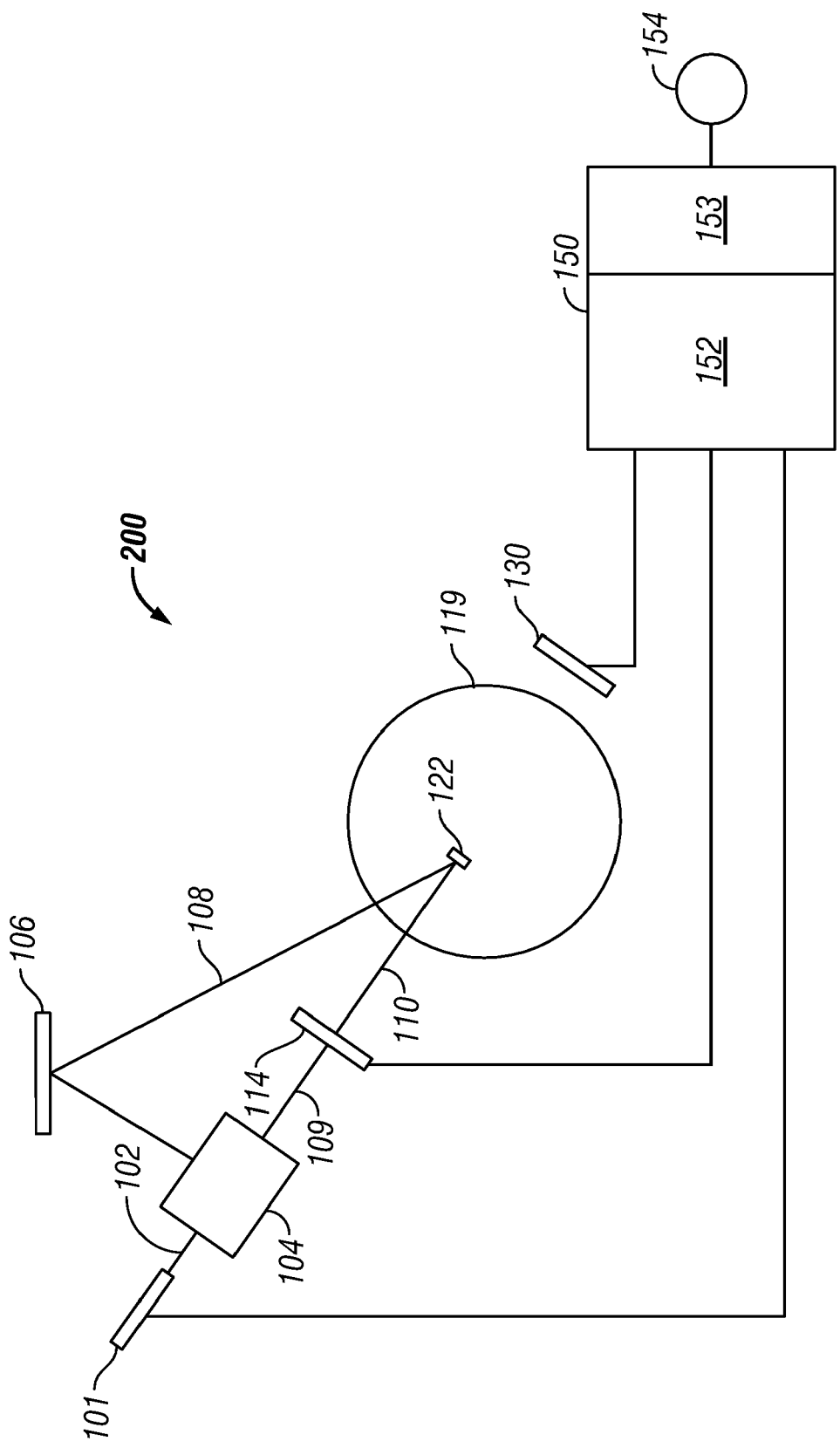
FIG. 2 is a schematic illustration of the holographic storage drive of FIG. 1.
Figure 3:
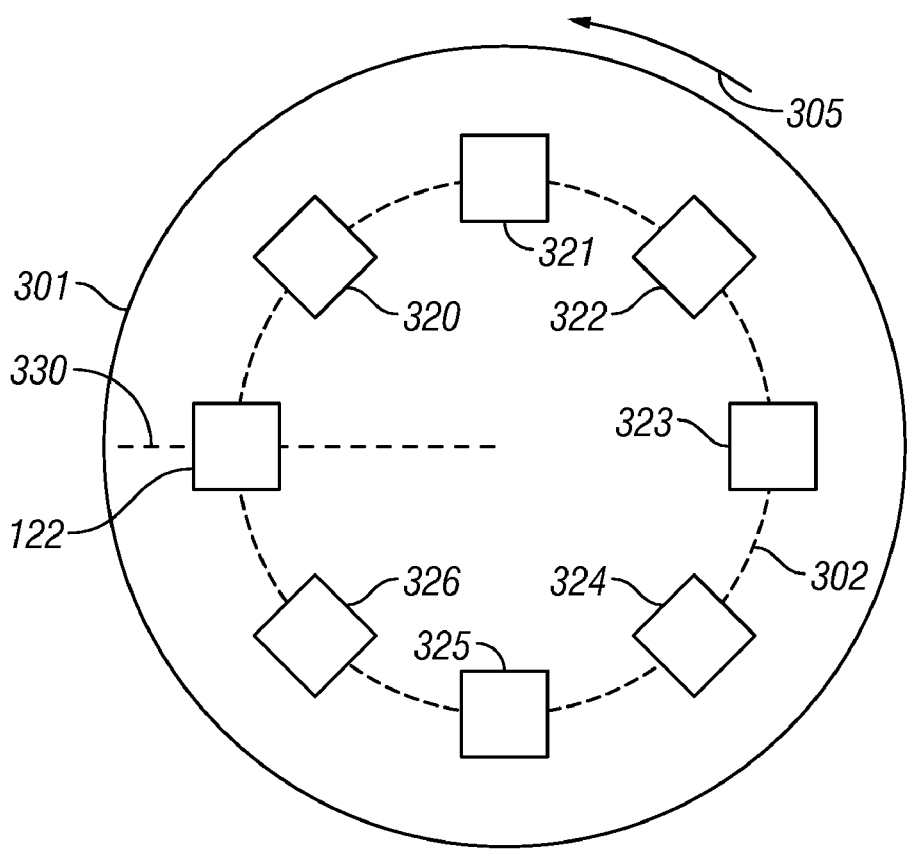
FIG. 3 is diagrammatic illustration of holographic media employed in the holographic storage drive of FIGS. 1 and 2.

Referring to FIGS. 1, 2 and 3, an embodiment of a holographic storage drive 100 of a holographic storage system 200 of a holographic storage system 200 is illustrated having one possible type of write path, called a "transmissive" light path. A light source 101 provides a laser beam 102 which is split by beam splitter 104 into a reference beam 108 and a carrier beam 109. The reference beam 108 is reflected by surface mirror 106 to the holographic storage media 119. The carrier beam 109 passes through a transmissive spatial light modulator (TSLM) 114 and is modulated thereby to provide a signal beam 110. As examples, the laser beam 102 may be at a blue wavelength of 405 nm, or may be at a green light wavelength of 532 nm, or may be at a red light wavelength of 650 nm, or at an infrared wavelength of 780 nm, or another wavelength of light tuned to the recording and/or reading characteristics of the holographic storage media. The holographic storage media 119 may comprise an element of the holographic storage drive 100, or alternatively be removable.

In holographic information storage, an entire segment of information 122 is stored at once as an optical interference pattern within a thick, photosensitive optical material, such as holographic storage media 119. This is done by intersecting two coherent laser beams within the material. One beam, called the reference beam 108, is designed to be simple to reproduce, for example, a collimated beam with a planar wavefront. The other beam, called the signal beam 110, is modulated so as to contain the information to be stored. The resulting optical interference pattern from the two coherent laser beams causes chemical and/or physical changes in the photosensitive optical material to provide a replica of the interference pattern. As examples, the replica of the interference pattern is stored as a change in the absorption, refractive index, or thickness of the photosensitive optical material.

When the stored interference pattern, called a hologram, is illuminated with one of the two waves that were used during recording, some of the incident light is diffracted by the stored interference pattern in such a fashion that the information can be read by a detector 130. Illuminating the hologram 122 with the reference beam 108 reconstructs the stored information as beam 145, and illuminating the hologram 122 with the signal beam 110 reconstructs the reference beam as beam 140.

A large number of these holograms 122, 123 may be superimposed in the same media and can be accessed independently, as long as they are distinguishable by the direction or the spacing of the holograms. Such separation can be accomplished by changing the angle between the signal and reference beams or by hanging the laser wavelength. Also, the holographic storage drive may reposition the holographic storage media 119. Any particular hologram can then be read out independently by illuminating the hologram with a beam that was used to store that hologram, because of the thickness of the hologram, the beam is diffracted by the interference pattern in such a fashion that only the desired beam is significantly reconstructed and imaged on a detector 130.

Examples of various holograms are illustrated in FIG. 3 in a surface holographic media 301 and shown as holograms 122, 320, 321 and 322-326, in the example distributed on data tract 302. The holograms may be accessed by moving the media 301 in the direction of arrow 305. Alternatively or additionally, holograms may be distributed laterally, for example in different tracks, or within the thickness of the holographic storage media.

Figure 4:
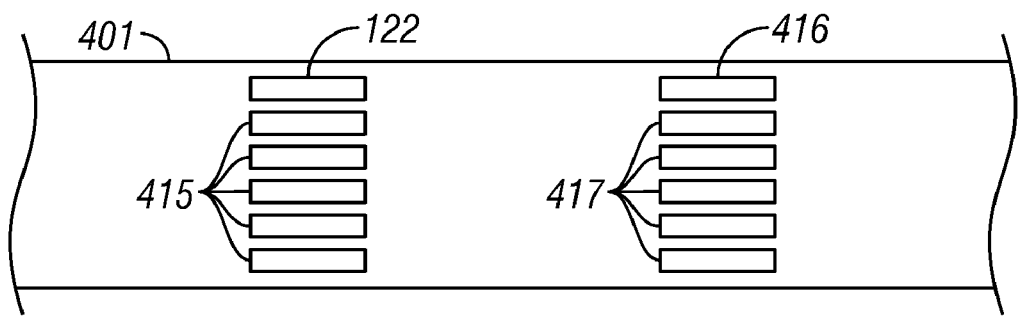
FIG. 4 is diagrammatic illustration of an alternative holographic media employed in the holographic storage drive of FIGS. 1 and 2.

Further examples of various holograms are illustrated in FIG. 4 in a volume holographic media 401 and shown as holograms 122, 415, 416 and 417. The holograms may be accessed by moving the focus point in media 401 or repositioning the media laterally.

In another example, the holograms 122, 320, 321 and 322-326 of FIG. 3 may also be stacked within the media 301 as shown by holograms 122, 415, 416 and 417 of FIG. 4.

High storage densities are achieved by positioning the holograms closely together, and much closer than depicted in the illustrations.

Referring to FIGS. 1 and 2, a transmissive spatial light modulator (TSLM) 114 may comprise a translucent LCD-type device, where information is represented by either a light or a dark pixel on the TSLM display. The carrier beam 109 picks up the image displayed by the TSLM 114 as the light passes through the TSLM and is modulated thereby to provide the signal beam 110 which is directed to the holographic storage media 119 to then interfere with reference beam 108 to form hologram 122.

Referring to FIGS. 1 and 2, the holographic storage drive 100 is operated by a control 150, comprising one or more computer processors 152 and one or more memories or storage apparatus 153. The control 150 and the holographic storage drive may form a holographic storage 200, or the control may comprise or be supplemented by additional computer processors which together operate the drive to provide the storage functionality of the holographic storage system. For example, the control 150 operates the light source 101, the TSLM 114, the detector 130, and the positioning of the beams and/or the holographic storage media 119.

The invention can take the form of an entirely hardware embodiment, an entirely software embodiment or an embodiment containing both hardware and software elements, which includes but is not limited to resident software, microcode, firmware, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for sue by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk—read only memory (CD-ROM), compact disk—read/write (CD-R/W), Digital Versatile Disk (DVD), High Definition DVD (HD-DVD), and Blu-Ray Disk (BD).

A data processing system suitable for storing and/or executing program code will include at least one processor 152 coupled directly or indirectly to memory elements 153 through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices 154 (including but not limited to keyboards, display, pointing devices, etc.) can be coupled to the system either directly or through intervening I/O controllers. Connections to the I/O may encompass connection links including intervening private or public networks. The communication links may comprise serial interconnections, such as RS-232 or RS-422, Ethernet connections, Gigabit Ethernet connections, SCSI interconnections, iSCSI interconnections, ESCON interconnections. Fibre Channel interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

Referring to FIGS. 1, 2, 3 and 4, the holograms 122, 123 of FIG. 1, the holograms 122, 320, 321 and 322-326 of FIG. 3 and the holograms 122, 415, 416 and 417 of FIG. 4 may be positioned closely together. For example, once written, if the media or optical system moves to other holograms, it may be difficult to find the original point at which a particular hologram was written in order to access the particular holograms.

Referring to FIGS. 1 and 2, in one embodiment, the holographic storage drive 100 of a holographic data storage system 200 is configured to write and read holograms 122, 123 at a plurality of locations of at least one holographic storage medium 119. The control 150 of the holographic data storage system is configured to operate the holographic storage drive to write at least a group of the holograms 123 in a predetermined pattern in the holographic storage medium, and to write a directory hologram 122 which relates to the holograms of the group, the directory hologram forming an anchor location of the predetermined pattern.

The carrier beam 109 becomes encoded with the data of the transmissive spatial light modulator (TSLM) 114 to form the signal beam 110, which contains the information to be stored. The resulting optical interference pattern from the signal beam 110 and reference beam 108 cause changes in the photosensitive optical material to provide a replica hologram 122 of the interference pattern.

Referring additionally to FIG. 3, in another embodiment, the control 150 is configured to operate the holographic storage drive to write the directory hologram 122 to form the anchor location in the vicinity of a reference line 330 of the holographic storage media 301. Reference line 330 may comprise a radial line.

The anchor location allows the control 150 to, once the directory hologram 122 is located, employ the predetermined pattern to access the desired hologram of the group of holograms. For example, in FIG. 3, holograms 320, 321 and 322-326 may form a group of holograms in a predetermined pattern with directory hologram 122. In FIG. 4, holograms 415 may form a group of holograms in a predetermined pattern with directory hologram 122, and holograms 417 may form a group of holograms in a predetermine pattern with a directory hologram 416.

Referring to FIGS. 1, 2, 5 and 6, a directory comprising the directory holograms is also stored in a memory, for example, memory 153, and the control 150 is configured top operate the holographic storage drive 100 to initiate access to at least one hologram of a group 123 with an access for the directory hologram of the group at the anchor location. For example, the control accesses a hologram 218 at the expected location of the directory hologram 122. The control 150 is also configured to operate the holographic storage drive 100 to read the accessed hologram, employing a matched filter to cross-correlate the read accessed hologram with an ideal version of the directory hologram derived from the directory stored in the memory; and to determine whether the read accessed hologram is the directory hologram of the group. The determination may comprise whether the cross-correlation at least meets a threshold.

Figure 5:
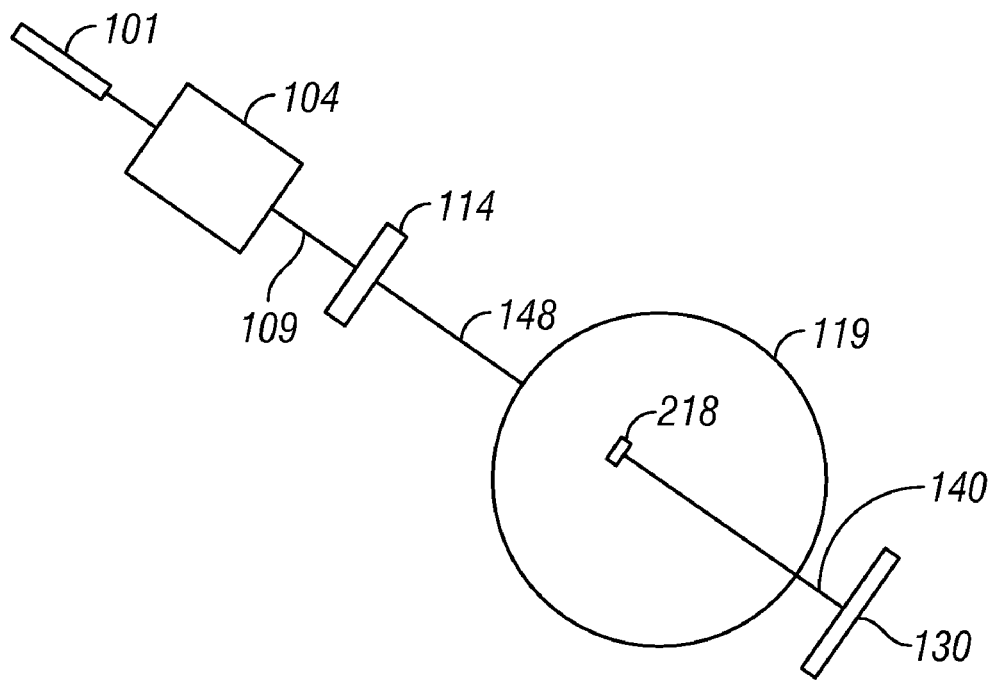
FIG. 5 is a schematic illustration of the holographic storage drive of FIGS. 1 and 2 employed in a read process.
Figure 6:
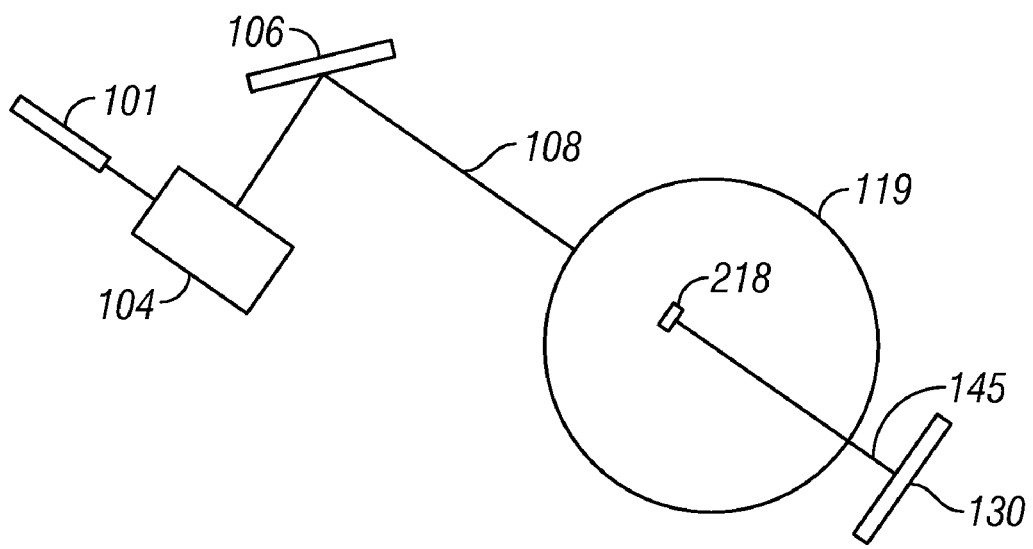
FIG. 6 is a schematic illustration of the holographic storage drive of FIGS. 1 and 2 employed in an alternative read process.

Referring to FIGS. 5 and 6, there are two ways to read a hologram generated by the interference of a reference beam and a signal beam. In the example of FIG. 5, the hologram 218 is illuminated with the original directory signal beam as the object wave 148. For example, light source 101 provides a laser beam 102 which beam splitter 104 supplies as a carrier beam 109. The beam splitter may block a reference beam or the mirror may direct the reference beam away from the hologram. The carrier beam 109 passes through the transmissive spatial light modulator (TSLM) 114 and is modulated thereby to provide an object wave 148 that comprises the desired directory image.

The desired directory image of the object wave 148 illuminates the hologram 218 and the incident light is diffracted by the stored interference pattern in such a fashion that an output beam 140 is produced that comprises information can be read by detector 130. The information read by the detector should resemble the original reference beam used to write the hologram. In an abstract sense, a hologram that is being read can be thought of as a little like an optical XOR operation, where the stored HOLOGRAM=REFERENCE WAVE <XOR> SIGNAL BEARING WAVE, and the read output beam 140 is SIGNAL BEARING WAVE <XOR> HOLOGRAM=REFERENCE WAVE.

Alternatively, in the example of FIG. 6, the hologram 218 is illuminated with the reference beam as the object wave 108 and the desired information of the original signal beam of the hologram 218 is reconstructed as beam 145 and is projected onto the detector 130. For example, light source 101 provides a laser beam 102 which beam splitter 104 supplies as a reference beam to form object wave 108. The beam splitter may block a carrier beam or the transmissive spatial light modulator (TSLM) may blank out any image via all dark pixels. The reference beam is reflected by mirror 106 to illuminate the hologram 218 and the incident light is diffracted by the stored interference pattern in such a fashion that an output beam 145 is produced that comprises information which can be read by detector 130. The information read by the detector should resemble the original known image of the signal beam used to write the hologram 218. As above, a hologram that is being read can be through of as a little like an optical XOR operation, where the stored HOLOGRAM=REFERENCE WAVE <XOR> SIGNAL BEARING WAVE, and the read output beam 145 is REFERENCE WAVE <XOR> HOLOGRAM=SIGNAL BEARING WAVE.

Referring to FIGS. 1, 2, 5 and 6, control 150 employs a matched filter to cross-correlate the read image of the accessed hologram 218 with the ideal version of the directory hologram 122 derived from the directory stored in the memory 153, and determines whether the read accessed hologram 218 is the directory hologram 122 of the group. The matched filter cross-correlation calculation is a two argument calculation where one argument is the impulse response of the ideal image stored in memory 153 and the second argument is the "copy" of the image of hologram 218 read at detector 130 from the media 119. In the case of the use of the directory image as the illumination of FIG. 4, the expected image is the reference wave, and in the case of the use of the reference beam as the illumination of FIG. 5, the expected image is the directory image.

The control 150 performs the following calculation between the respective image $g(x,y)$ read from the hologram and the matched filter matched to the impulse response $h(x,y)=s^*(-x,-y)$ of the ideal case of the expected image, as shown in eqn.(1). For example, for use of the directory image for illumination of FIG. 4, $V(x,y)$ in eqn.(1) is the cross-correlation between the reference beam read from the disk $g(x,y)$ and the expected reference beam $s(x,y)$. Alternatively, for use of the reference beam 108 for illumination of FIG. 4, $V(x,y)$ in eqn.(1) is the cross-correlation between the image read from hologram 218 $g(x,y)$ and the actual directory 122 $s(x,y)$. The correlation of the arguments is to identify the extent of imperfections. $V(x,y)$ has to meet or exceed a threshold of imperfections for the correlation to allow the control to determine that the read accessed hologram 218 is the desired directory 122.

Eqn.[1] comprises a double integral, meaning that the integration is over the X axis and Y axis directions of the detector 130. $\xi$ is the integration variable along the X axis of detector 130, $\eta$ is the integration variable along the Y axis of detector 130, and * denotes a complex conjugate.

$$V(x,y)=\iint g(\xi,\eta)s^*(\xi-x,\eta-y)]d\xi d\eta \qquad \text{Eqn.[1]}$$

Mathematically, $V(x,y)$ is a surface varying along the X axis and the Y axis, for each $(x,y)$. There is one value of $V(x,y)$ for each detector element in detector 130. The range of $V(x,y)$ for each $(x,y)$ is between $-1$ and $+1$, where $+1$ represents the ideal correlation of one hundred percent (100%). To maximize $V(x,y)$, the following difference surface, Difference$(x,y)$, is defined in Eqn.[2]. As shown, Difference$(x,y)$ is calculated by subtracting the matched filter correlation $V(x,y)$ from unity. Difference$(x,y)$ may be evaluated (a) point-to-point, (b) as an arithmetic means, (c) as a geometric means, and (d) as a root-mean-square. Difference$(x,y)$ ranges between 0 and +2, and the ideal difference for each value of $(x,y)$ is 0, meaning for a value of 0 that there is no difference between the image 140 or 145 read from the holographic media 119 and the ideal holographic pattern at that point $(x,y)$. Difference$(x,y)$ may be evaluated point-by-point in read difference calculations, but the control 150 alternatively may quantify surface Difference$(x,y)$ in terms of a single number, to simplify read difference calculations. Such single numbers may be MAX_Difference which is equal to the maximum value of Difference$(x,y)$. Alternatively, AM_Difference, the arithmetic mean of the values of Difference$(x,y)$, GM_Difference, the geometric mean of the values of Difference$(x,y)$, or RMS_Difference, the root-mean-square of the values of Difference $(x,y)$ may be used in the read difference calculations.

$$\text{Difference}(x,y)=1-V(x,y) \qquad \text{Eqn.[2]}$$

$V(x,y)$ would have to exceed a threshold for the correlation to be acceptable. Alternately, Difference$(x,y)$, MAX_Difference, AM_Difference, GM_Difference, or RMS_Difference, would have to be beneath a threshold for the correlation to be acceptable. It is the set of Difference$(x,y)$, MAX_Difference, AM_Difference, GM_Difference, and RMS_Difference which give the most flexibility for implementation.

The cross-correlation can never exceed a 100% correlation (a perfect condition). However, a cross-correlation less than 100% means that imperfections exist.

In the example of FIG. 5, where the read output beam 140 is expected to comprise the wave resembling the reference wave that was used to write the hologram, if the correlation is 100%, all points of the detector 130 would be "1"s, and the correlation calculation would produce all "1"s (100%).

Thus, the terms "cross-correlation", "matched filter" and "known image" refer to whatever means is used to make the correlation, whether the directory image is used to generate a read output beam that resembles the reference wave and the correlation calculation is with respect to the impulse response of the reference wave, or whether a reference wave is used to generate a read output beam that resembles the expected directory image and the correlation calculation is with respect to the impulse response of the directory image.

If the accessed hologram 218 is not the directory hologram, the control 150 again attempts to access the directory hologram 122. Once a determination has been made that the accessed hologram 218 is the directory hologram 122 at the anchor location for the group of holograms, the desired hologram or holograms of the group are accessed in accordance with the predetermined pattern.

Figure 7:
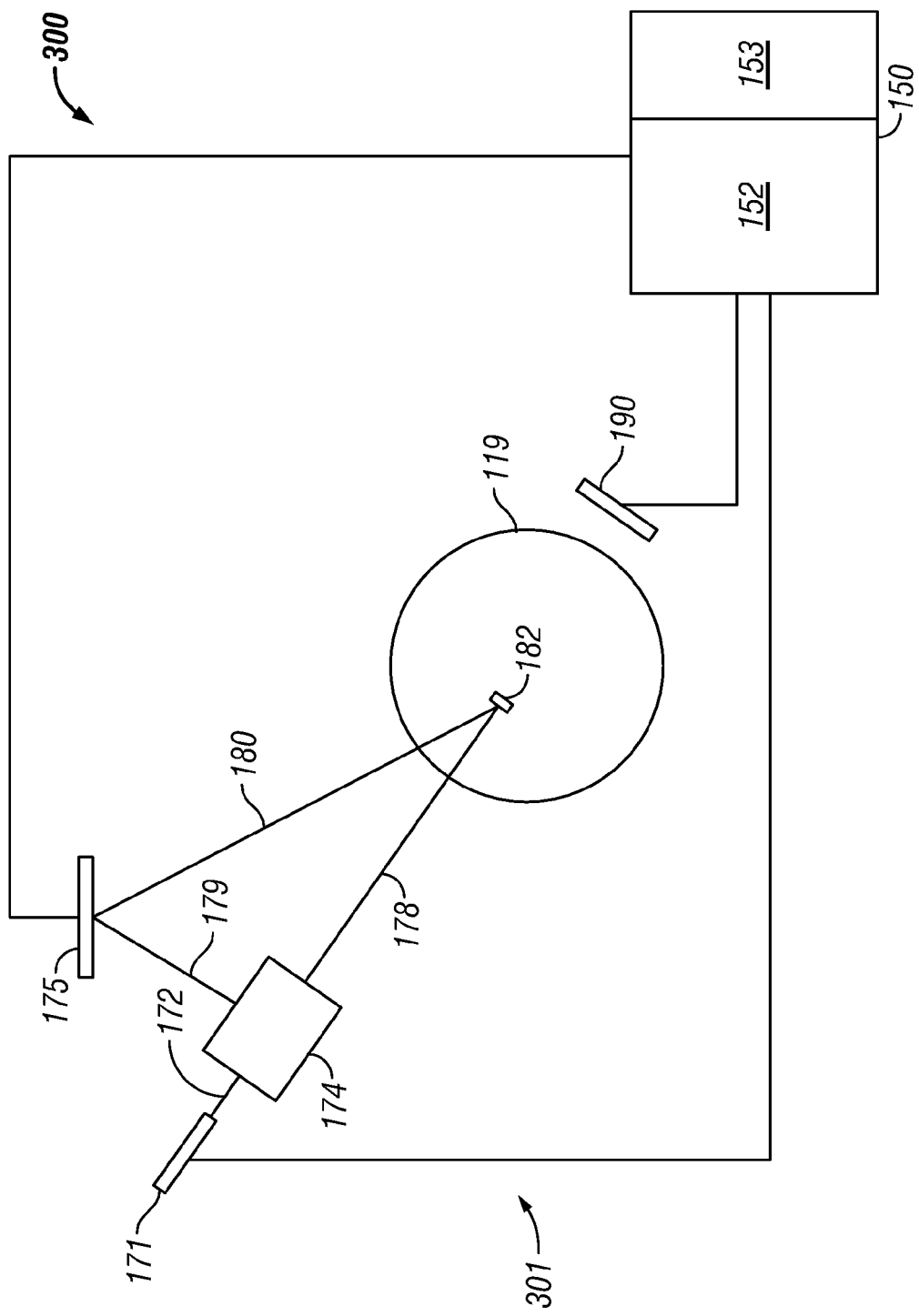
FIG. 7 is a schematic illustration of an alternative embodiment of a holographic storage drive in accordance with the present invention.

FIG. 7 represents an alternative embodiment of a holographic storage system 300 having a holographic storage drive 301 with an alternative type of write path, called "reflective" light path. A light source 171 provides a laser beam 172 which is split by beam splitter 174 into a reference beam 178 and a carrier beam 179. The reference beam 178 is directed to the holographic storage media 119. The carrier beam 109 is directed to a reflective spatial light modulator (RSLM) 175 and is modulated thereby to provide a signal beam 180.

A reflective spatial light modulator (RSLM) 175 may comprise an assembly of a plurality of micro mirrors. Alternatively, the RSLM comprises a liquid crystal on silicon ("LCOS") display device in which the crystals are coated over the surface of a silicon chip. The electronic circuits that drive the formation of the image are etched into the chip, which is coated with a reflected (for example, aluminized) surface. The resulting optical interference pattern from the signal beam 180 and reference beam 178 cause chemical and/or physical changes in the photosensitive optical material to provide a replica 182 of the interference pattern, as discussed above.

In a manner similar to the TSLM drive 100 of FIGS. 1 and 2, the holographic storage drive 301 of FIG. 6 is operated by a control 150, comprising one or more computer processors 152 and one or more memories or storage apparatus 153. The control 150 and the holographic storage drive may form a holographic storage system 300, or the control may comprise or be supplemented by additional computer processors which together operate the drive to provide the storage functionality of the holographic storage system. For example, the control 150 operates the light source 171, the RSLM 175, the detector 130, and the positioning of the beams and/or the holographic storage media 119.

The read and read-back process is also similar to the TSLM drive 100 of FIGS. 1 and 2, creating the same images to be cross-correlated in accordance with the present invention.

Reference is made to the incorporated Ser. No. 11/737,670 Application for its showing of holographic data storage systems and matched filters.

The present invention is therefore applicable to the various holographic drives and light paths.

Figure 8:
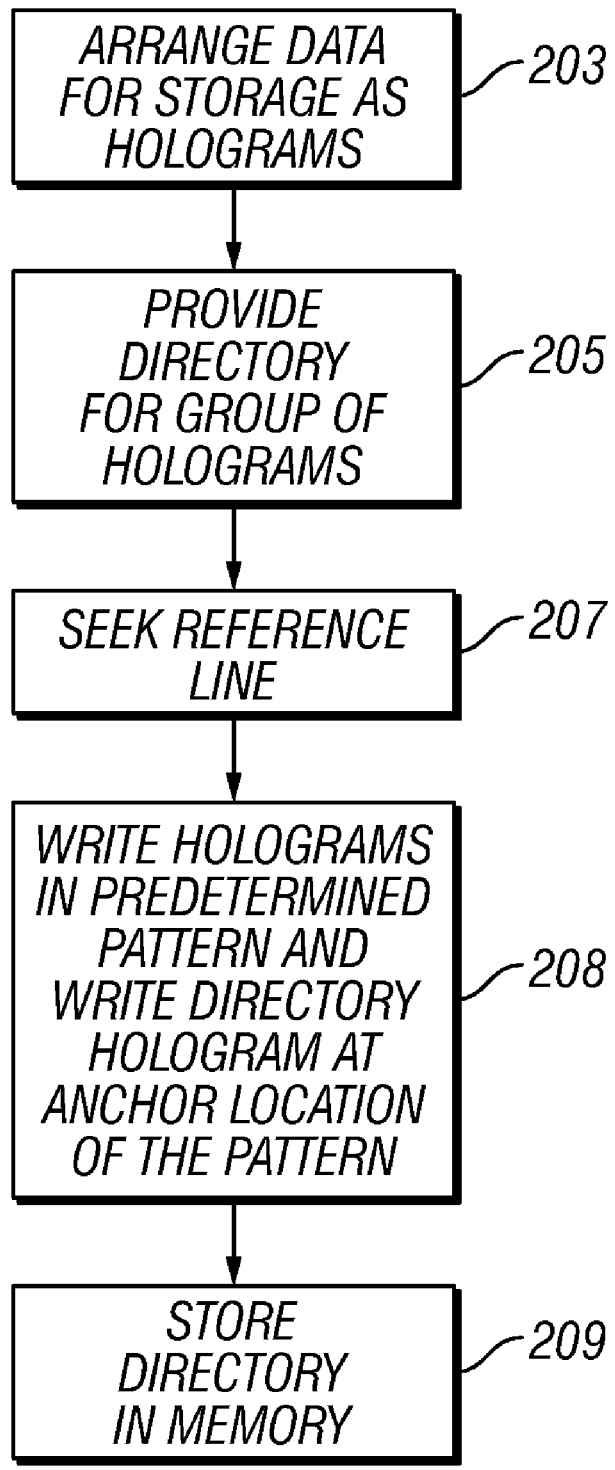
FIG. 8 is a flow chart depicting an embodiment of the write process of the present invention.
Figure 9:
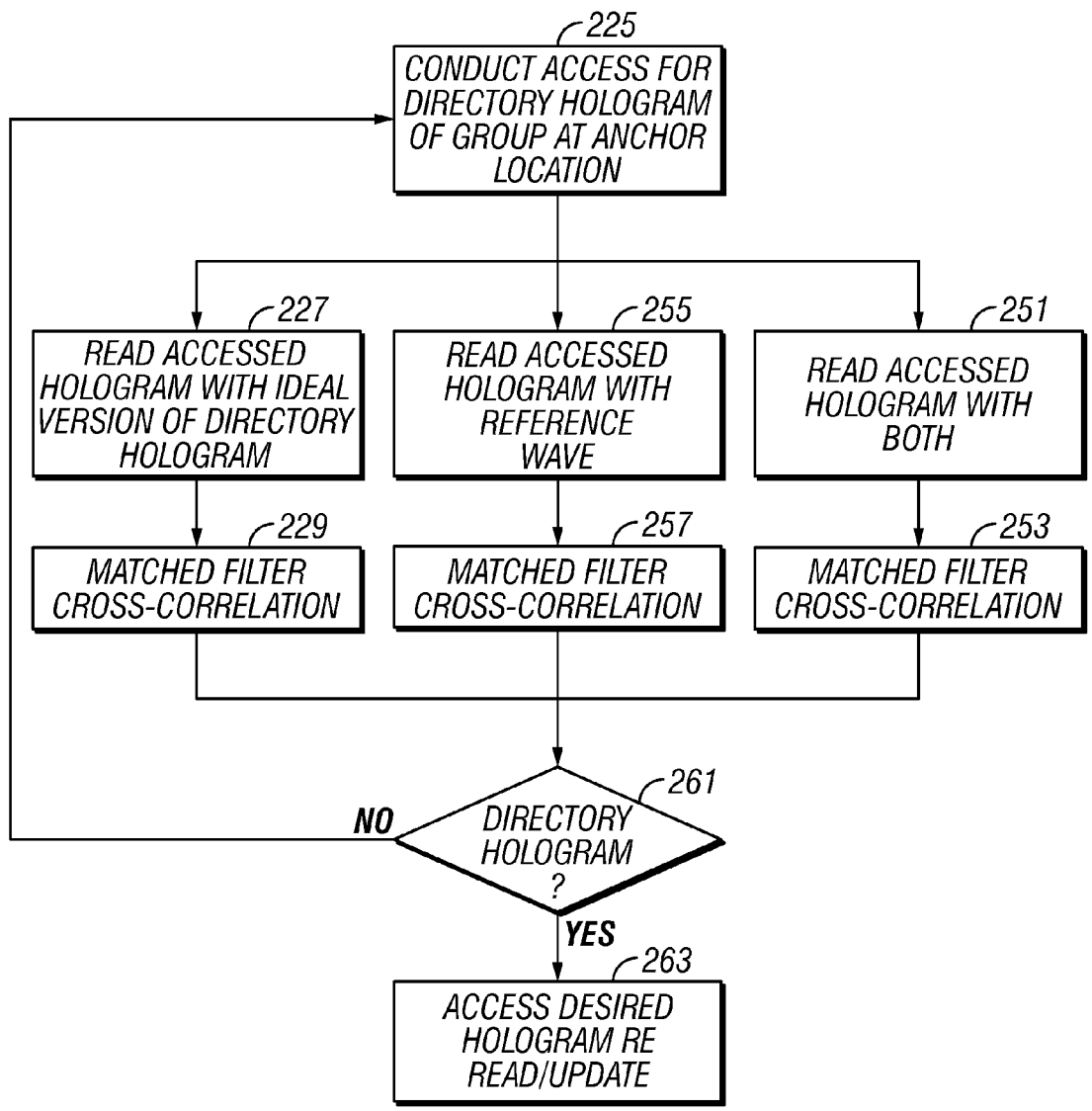
FIG. 9 is a flow chart depicting an embodiment of the read process of the present invention.

Referring additionally to FIGS. 8 and 9, embodiments of the methods and computer program product implementations of the present invention begins at step 203 when the media 119 is mounted (if it is removable) on the holographic storage drive, and/or when the media is accessed, and data is arranged for storage as a group of holograms. In step 205, a directory is provided for the group of holograms. The arrangement of the data and the provision of the directory may be accomplished by the control 150 or by a host system or an intermediate processor. If a reference line of the media is available, in step 207, control 150 is optionally configured to operate the holographic storage drive 100 to seek to the vicinity of a reference line of the holographic storage media.

In step 208, the control is configured to write at least a group of the holograms in a predetermined pattern in the holographic storage medium, and to write a directory hologram 122 which relates to the holograms of the group, the directory hologram forming an anchor location of the predetermined pattern. The anchor location may be in the vicinity of the reference line of step 207.

In an further embodiment, in step 209, the directory comprising the directory hologram is also stored in a memory, for example, in a memory of the host system, or, alternatively, in the memory 153. The total directory may comprise further holograms or parts of holograms in addition to the directory hologram 122.

Thus, a group of the holograms are stored in media 119 in a predetermined pattern, and a directory hologram 122 which relates to the holograms of the group is stored at an anchor location of the predetermined pattern.

Referring additionally to FIG. 9, the control is configured to, in step 225, initiate access to at least one hologram of a group with an access for the directory hologram of the group at the anchor location.

Once a hologram has been accessed, the control 150 is configured to read the accessed hologram, employing a matched filter to cross-correlate the read accessed hologram with an ideal version of the directory hologram derived from the directory stored in the memory; and to determine whether the read accessed hologram is the directory hologram of the group.

In one embodiment, the holographic storage drive is configured to read the accessed hologram in steps 227 and 229 by illuminating the accessed hologram with an object wave; and the control is configured to operate the holographic storage drive to provide the ideal version of the directory hologram 122 as the object wave and to cross-correlate the resultant wave image employing a matched filter matched to the impulse response of a reference wave for the directory hologram. As discussed above, the image for the ideal version of the directory hologram is derived from the directory stored in memory.

In a further embodiment, the holographic storage drive is configured to, in steps 251 and 253, first conduct steps 227 and 229 and then read the accessed hologram by also illuminating the accessed hologram with a reference wave; and the control is configured to cross-correlate the resultant wave image employing a matched filter matched to the impulse response of a ideal version of the directory hologram 122.

In another embodiment of steps 255 and 257, the holographic storage drive is configured to read the accessed hologram by illuminating the accessed hologram with a reference wave; and the control is configured to cross-correlate the resultant wave image employing a matched filter matched to the impulse response of an ideal version 122 of the directory hologram.

In step 261, the average of V(x,y) is compared to a correlation threshold to determine whether the accessed hologram is the directory hologram 122. In effect, the level of imperfections is compared to threshold at which the level of imperfections is deemed to indicate that the hologram is the same as the ideal directory hologram. Alternatively, the minimum V(x,y), MAX Difference, AM Difference, GM Difference, and RM Difference may be used in step 261. Once a determination has been made that the accessed hologram is the directory hologram 122 at the anchor location for the group of holograms, in step 263, the desired hologram or holograms of the group are accessed in accordance with the predetermined pattern.

If step 261 determines that the accessed hologram is not the directory hologram, the control 150 again attempts to access the directory hologram 122 in step 225.

In a further embodiment, the directory hologram 122 may instead or additionally comprise metadata for a group of holograms organized as plurality of RAID data segments. The term "RAID" is understood to generally mean a "Redundant Array of Independent Disks", but herein "RAID" is intended to mean a redundant array of data segments.

Referring to FIGS. 10-15, one example of a RAID system for forming and reading an array of redundant data segments is discussed. Alternatively, any suitable RAID system may be used form the redundant array of data segments.

Figure 10:
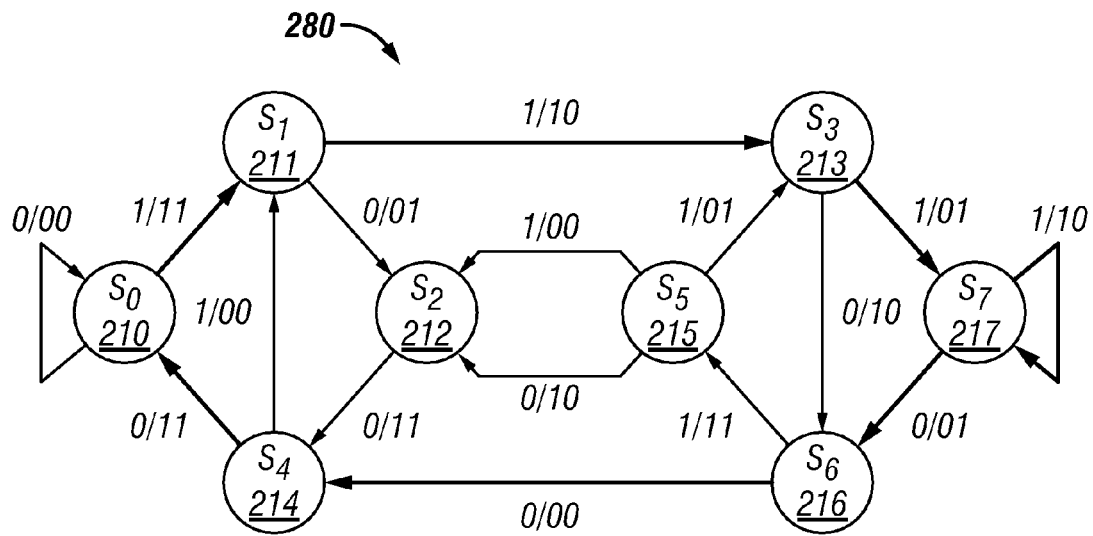
FIG. 10 is diagrammatic illustration of a state diagram for convolution encoding of a RAID system employed in the holographic storage drive of FIG. 1.

A state diagram 280 for (2,1,3) binary convolution encoding is shown in FIG. 10. State diagram 280 comprises eight states; S0 210, S1 211, S2 212, S3 213, S4 214, S5 215, S6 216, and S7 217. Discrete jumps between states, in state diagram 280, are limited in number and direction. For example, the encoding process staring at state S0 210 can only jump back to S0 210 or S1 211. Similarly, the process from S1 211 can only jump to S2 212 or S3 213, etc. Each jump between states in state diagram 280 results in the encoding of one bit of host information into two bits of encoded data. In FIG. 10, highlighted encoding path S0 210, S1 211, S3 213, S7 217, S7 217, S6 216, S4 214, and S0 210 is shown for the example encoding of 1111000. S0 210 to S1 211 encodes 1 into 11. S1 211 to S3 213 encodes 1 into 10. S3 213 to S7 217 encodes 1 into 01. S7 217 to S7 217 encodes 1 into 10. S7 217 to S6 216 encodes 0 into 01. S6 216 to S4 214 encodes 0 in 00. Finally, S4 214 to S0 210 encodes 0 into 11. The result of this is that host information 1111000 is encoded into 11100110010011 for storage in the holographic RAID.

Figure 11:
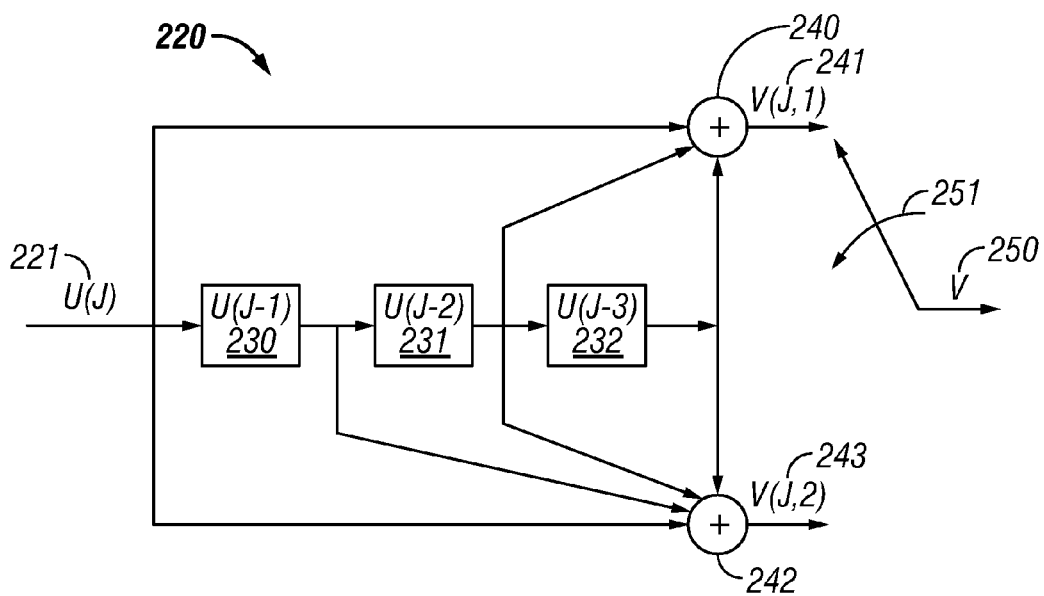
FIG. 11 is diagrammatic illustration of a circuit for convolution encoding of a RAID system employed in the holographic storage drive of FIG. 1.

In FIG. 11, encoder circuit 220 is shown for the binary (2, 1, 3) code of state diagram 280 of FIG. 10.

Encoder circuit 220 is one implementation of an encoder. Encoder circuit 220 receives input data stream U(J) 221 one bit at a time, for encoding. Encoder circuit 220 comprises an m=3-stage shift register, comprising registers 230, 231, and 232. The initial contents of registers 230-232 are preferably zero for the encoding process. The input host information stream U(J) 221 and the outputs of registers 230, 231, and 232 are selectively added by n=2 modulo-2 adders (which means there is no carryover in binary addition); comprising adder 240 to produce output V(J,1) 241, and adder 242 to produce output V(J,2) 243. Multiplexer 251 serializes the individual encoder outputs V(J,1) 241 and V(J,2) 243 into encoded output V 250. The modulo-2 adders can be implemented as XOR (exclusive or) gates. Since modulo-2 binary addition is a linear operation, the encoder is a linear feedforward shift register. Each incremental output of V 250 for an index of J, as defined by V(J,1) and V(J,2) in FIG. 11, may be called a word.

Figure 12:
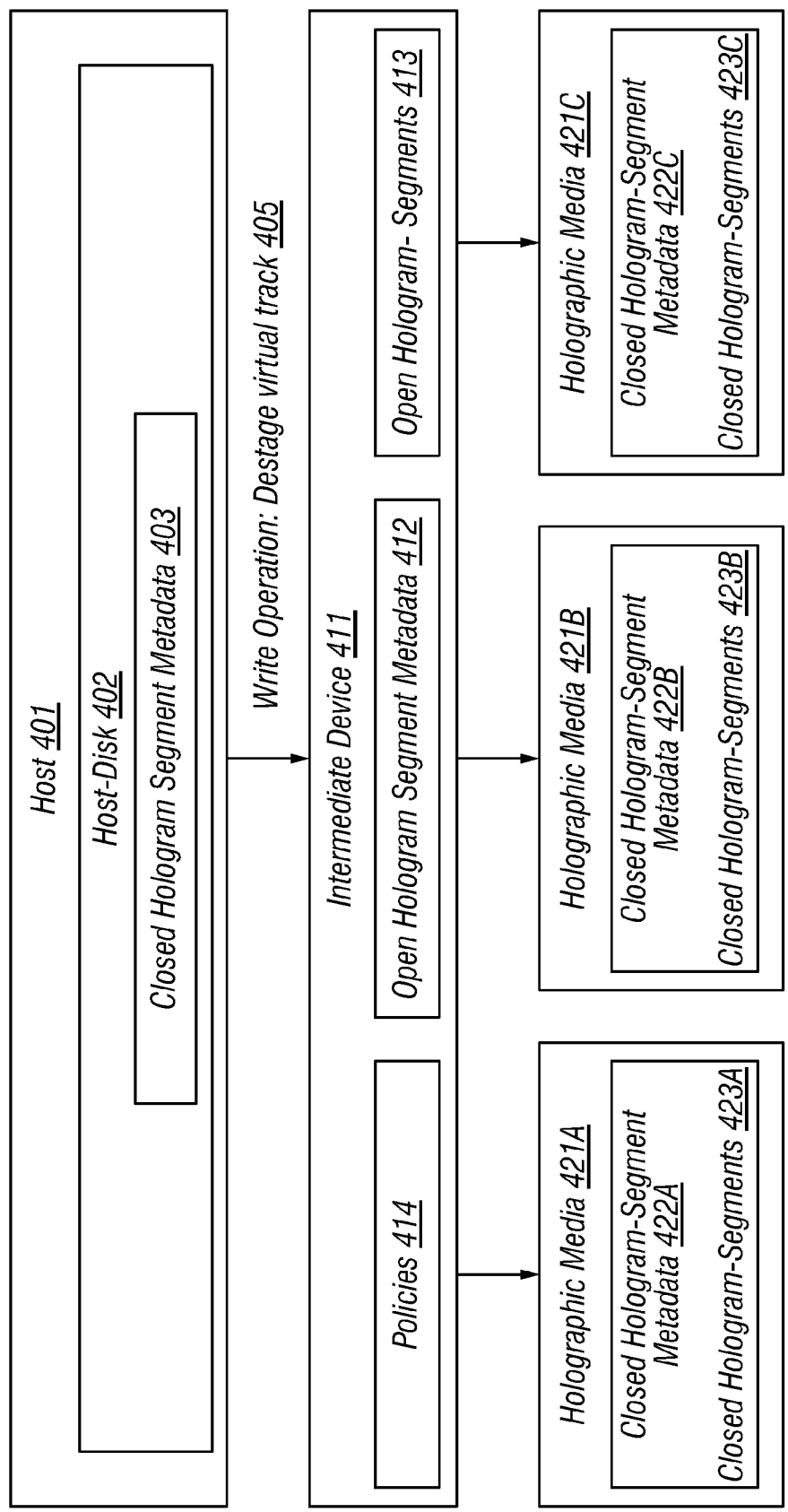
FIG. 12 is a schematic illustration of the holographic storage drive of FIG. 1 employed for RAID storage.

Referring to FIG. 12, this RAID encoding is preferably done at an intermediate device 411, where the trellis decoding is also preferably done, in order to alleviate unnecessary work at the host level 401, 402 or at the device level.

Figure 13:
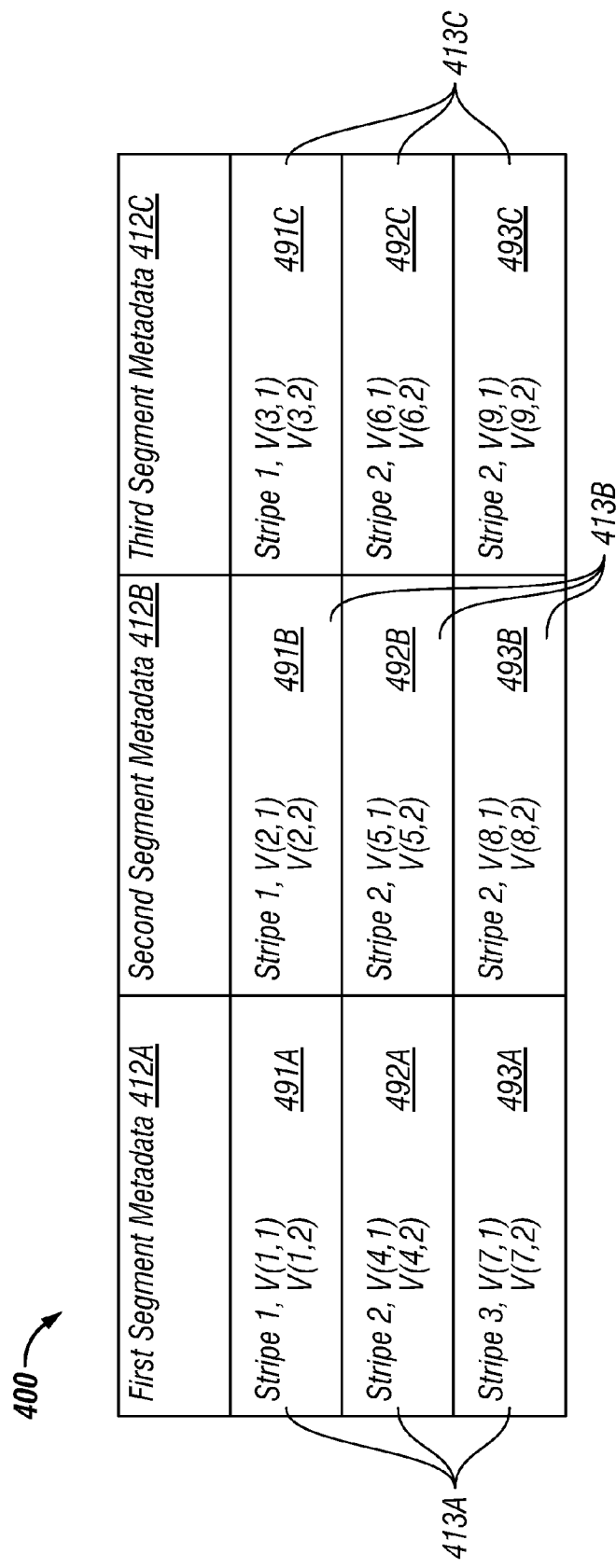
FIG. 13 is a diagrammatic illustration of a stripe layout of a RAID system employed in the holographic storage drive of FIGS. 1 and 12.

The intermediate device 411 maintains a number of open hologram segments 413, which are segments which are being formed or arranged. Each hologram segment 413 is essentially a columnar vector component of a matrix 400 (FIG. 13). Matrix 400 is an assemblage of open hologram segments 413, and their respective open metadata 412. Data is written by host 401 using "destage virtual track" operations 405 to the intermediate device 411, where it is convolution encoded (FIGS. 10-11) into matrix 400 in intermediate device 411. The "destage virtual track" operation 405 can be a SCSI write command, SCSI over Fibre Channel, an iSCSI command, a GbEN command, or any other operation sending data from a host system 401 to the intermediate device 411.

FIG. 13 shows how this data from host 401 is arranged in matrix 400 in intermediate device 411. For example, RAID-stripe 1 comprises 491A-C, RAID-stripe 2 comprise 492A-C, and RAID-stripe 3 comprises 493A-C. In FIG. 13, the columns comprise both one of RAID-segment metadata 412A-C and respective one of open segments 413A-C. Each open segment 413A-C has a portion of stripes 1-3, 491A-C to 493A-C. Each RAID-segment metadata 412A-C essentially comprises the metadata associated with that portion of stripes 491A-C to 493A-C, so that the matrix 400 can be reassembled upon a read operation. Metadata 412A-C uniquely identifies open segments 412A-C may contain file name, file date and time of creation, file version, and IDs of adjacent segments in matrix 400 (for proper reassembly during the read process).

An Open RAID-Hologram-Segment Metadata 412A-C is maintained in the intermediate device 411 for each open RAID-Hologram-Segment 413A-C. Open RAID-Hologram-Segment Metadata 412A-C are the metadata which is used to map how and where data are stored in the open RAID Hologram-Segments 413A-C. When the Open Hologram-Segments 413A-C are closed or completed and ready to be written, the Hologram Metadata 412A-C are replicated and (a) embedded as Closed-Holograms 422A-C within respective Closed-Hologram-Segments 423A-C for storage on the holographic media 421A-C.

The newly closed Hologram-Metadata is transferred to the host 401 where they used to update the overall Hologram-metadata 403, which may be stored on a Host-Disk 402. At this point, the intermediate device 411 ceases to retain any information about the RAID-Hologram-Segment that has just been closed.

Open Hologram-Segments 412 are closed based on user-selectable policies 414. These Hologram-Segment close-policies comprise parameters such as (a) a maximum time a Hologram-Segment can be opened, (b) the amount data stored in a hologram segment exceeds a threshold, such as a threshold of holographic pages, etc.

The metadata is stored as a directory hologram at the anchor location for the RAID holograms. Thus, the metadata 422A-C is used both for its logical contents and its physical location (anchor location). The RAID holograms are located in a predetermined pattern with respect to the directory hologram.

Referring to FIGS. 1, 2, 9 and 13, the control 150 is configured to, in step 225, initiate access to at least one hologram of a group with an access for the directory hologram of the group at the anchor location. Once a hologram has been accessed, the control 150 is configured to read the accessed hologram, employing a matched filter to cross-correlate the read accessed hologram with an ideal version of the directory hologram derived from the directory stored in the memory; and to determine whether the read accessed hologram is the directory hologram of the group, all as discussed above.

Once the directory hologram has been located, the directory and metadata contents may be employed to read the desired data from the RAID holograms. The RAID holograms are accessed in accordance with the predetermined pattern in which they are stored.

Figure 14:
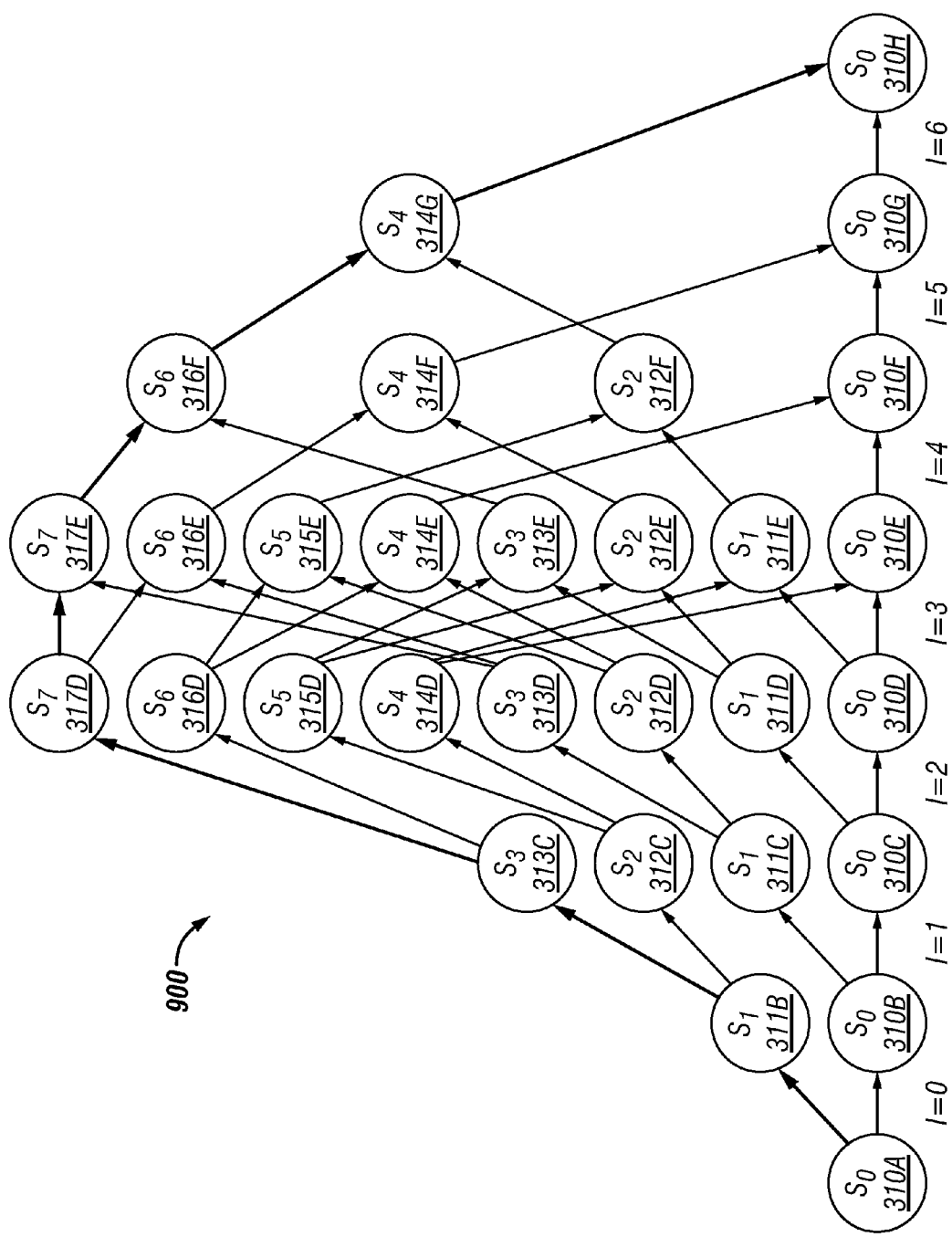
FIG. 14 is a diagrammatic illustration of trellis decoding of a RAID system employed in the holographic storage drive of FIGS. 1 and 12.

Once the individual segments 423A-C have been reassembled in matrix 400, the decoding process uses a trellis decoder to decode coded data and retrieve the customer data. The operation of a trellis decoder may be explained by use of trellis diagram 900 (FIG. 14). States S0-S7 are shown in FIG. 14 and it is assumed that the initial contents of all memory registers, of the convention encoder used to encode the data, are initialized to zero. This means that the trellis diagram used to decode the data back into the original information always begins at state S0 and conclude at state S0.

The trellis diagram 900 begins at state S0 310A. From S0 310A, trellis diagram 900 transitions to either S0 310B or S1 311B. The increase from suffix A to suffix B in the numbering of the states in trellis diagram 900 is called a branch, and the branch index I is zero when transitioning from suffix A to suffix B. From S0 310B, trellis diagram 900 transitions to either S0 310C or S1 311C; and from S1 310B, transitions to either S2 312C or S3 313C, and the branch index I is 1. From S0 310C, trellis diagram 900 transitions to either S0 310D or S1 311D; from S1 311C transitions to either S2 312D or S3 313D; from S2 312C transitions to either S4 314D or S5 315D; or from S3 313C transitions to either S6 316D or S6 317D, and the branch index I is 3.

The next series of transitions in trellis diagram 900 show the breath of the decoding effort. From S0 310D, trellis diagram 900 transitions to either S0 310E or S1 311E; from S1 311D, trellis to either S2 312E or S3 313E; from S2 312D transitions to either S4 314E or S5 315E; or from S3 313D transitions to either S6 316E or S6 317E, and the branch index I is 4. Also, From S6 316D transitions to either S5 315E or S4 314E; from S5 315D transitions to either S3 313E or S2 312E; or from S4 314D transitions to either S1 311E or S0 310E.

Typically, what is shown for branch index I=4 is repeated a plurality of times in a trellis diagram. Only one such iteration is discussed with respect to FIG. 14. For the rest of FIG. 14, the trellis diagram is shown to conclude, indicating the ending of the decoding process. From S0 310E, trellis diagram 900 transitions only to S0 310F; from S1 311E transitions only to S2 312F; from S2 312E transitions only to S4 314F; and from S3 313E transitions only to S6 316F, and the branch index I is 5. Also, from S7 317E, trellis diagram 900 transitions only to S6 316F; from S6 316E transitions only to S4 314F; from S5 315F. From transitions only to S4 314G; and the branch index I is 6.

Also, from S6 316F, trellis diagram 900 transitions only to S4 314G; and from S4 314F transitions only to S0 310G. Finally, from S0 310G, trellis diagram 900 transitions only to S0 310H; and the branch index I is 7. Also, from S4 314G, trellis diagram 900 transitions only to S0 310H.

Thus, in FIG. 14, the example of the decoding path S0 310A, S1 311B, S3 313C, S7 317D, S7 317E, S6 316F, S4 314G, and S0 310H takes the encoded data 11100110010011 and decodes it into 1111000, per the encoding-decoding table of FIG. 15. This table is useful in explaining both the encoding and decoding process, and it is generated via FIG. 10.

Those of skill in the art will understand that changes may be made with respect the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for storing holograms with respect to at least one holographic storage medium, said holograms at a plurality of locations in said holographic storage medium; comprising the steps of:

writing at least a group of said holograms in a predetermined pattern in said holographic storage medium;
   writing a directory hologram which relates to said holograms of said group at an anchor location of said predetermined pattern, wherein a directory comprising said directory hologram is also stored in a memory;
   initiating access to at least one hologram of a group with an access for said directory hologram of said group at said anchor location;
   reading said accessed hologram, employing a partial matched filter to cross-correlate said read accessed hologram with an ideal version of said directory hologram derived from said directory stored in said memory; and
   determining whether said read accessed hologram is said directory hologram of said group.

2. The method of claim 1, wherein said step of writing said directory hologram comprises writing said directory hologram to form said anchor location in the vicinity of a reference line of said holographic storage media.

3. The method of claim 1, wherein said step of reading said accessed hologram comprises illuminating said accessed hologram with an object wave; and providing said ideal version of said directory hologram as said object wave and cross-correlating the resultant wave image employing a partial matched filter matched to the impulse response of a reference wave for said directory hologram.

4. The method of claim 3, wherein said step of reading said accessed hologram additionally comprises also illuminating said accessed hologram with a reference wave; and also cross-correlating the resultant wave image employing a partial matched filter matched to the impulse response of an ideal version of said directory hologram.

5. The method of claim 1, wherein said step of reading said accessed hologram comprises illuminating said accessed hologram with a reference wave; and cross-correlating the resultant wave image employing a partial matched filter matched to the impulse response of an ideal version of said directory hologram.

6. The method of claim 1, additionally comprising the steps of:

arranging data into at least one RAID configuration comprising a plurality of RAID data segments and to provide metadata of said RAID data segments; and
   writing said RAID data segments as separate holograms of at least one said group, and writing said directory hologram containing said metadata.

7. A method for accessing holograms with respect to at least one holographic storage medium, said holograms at a plurality of locations in said holographic storage medium; said holograms arranged in at least a group of said holograms in a predetermined pattern in said holographic storage medium with a directory hologram which relates to said holograms of said group, said directory hologram forming an anchor location of said predetermined pattern; and wherein a directory comprising said directory hologram is also stored in a memory; comprising the steps of:

initiating access to at least one hologram of a group with an access for said directory hologram of said group at said anchor location;
   reading said accessed hologram, employing a partial matched filter to cross-correlate said read accessed hologram with an ideal version of said directory hologram derived from said directory stored in said memory; and
   determining whether said read accessed hologram is said directory hologram of said group.

8. The method of claim 7, wherein said step of reading said accessed hologram comprises illuminating said accessed hologram with an object wave; and providing said ideal version of said directory hologram as said object wave and cross-correlating the resultant wave image employing a partial matched filter matched to the impulse response of a reference wave for said directory hologram.

9. The method of claim 8, wherein said step of reading said accessed hologram additionally comprises also illuminating said accessed hologram with a reference wave; and also cross-correlating the resultant wave image employing a partial matched filter matched to the impulse response of an ideal version of said directory hologram.

10. The method of claim 7, wherein said step of reading said accessed hologram comprises illuminating said accessed hologram with a reference wave; and cross-correlating the resultant wave image employing a partial matched filter matched to the impulse response of an ideal version of said directory hologram.

* * * * *